A. D. RENFRO.
SPEED INDICATOR AND RECORDER.
APPLICATION FILED FEB. 14, 1910.

982,021.

Patented Jan. 17, 1911.
5 SHEETS—SHEET 1.

WITNESSES.
O. E. Day
Herman C. Nicholaus

INVENTOR.
Alva D. Renfro
by Parker & Burton, Attorneys.

A. D. RENFRO.
SPEED INDICATOR AND RECORDER.
APPLICATION FILED FEB. 14, 1910.

982,021.

Patented Jan. 17, 1911.
5 SHEETS—SHEET 2.

WITNESSES.
B. E. Day
Herman L Nicholaus

INVENTOR.
Alva D. Renfro
by Parker & Burton Attorneys.

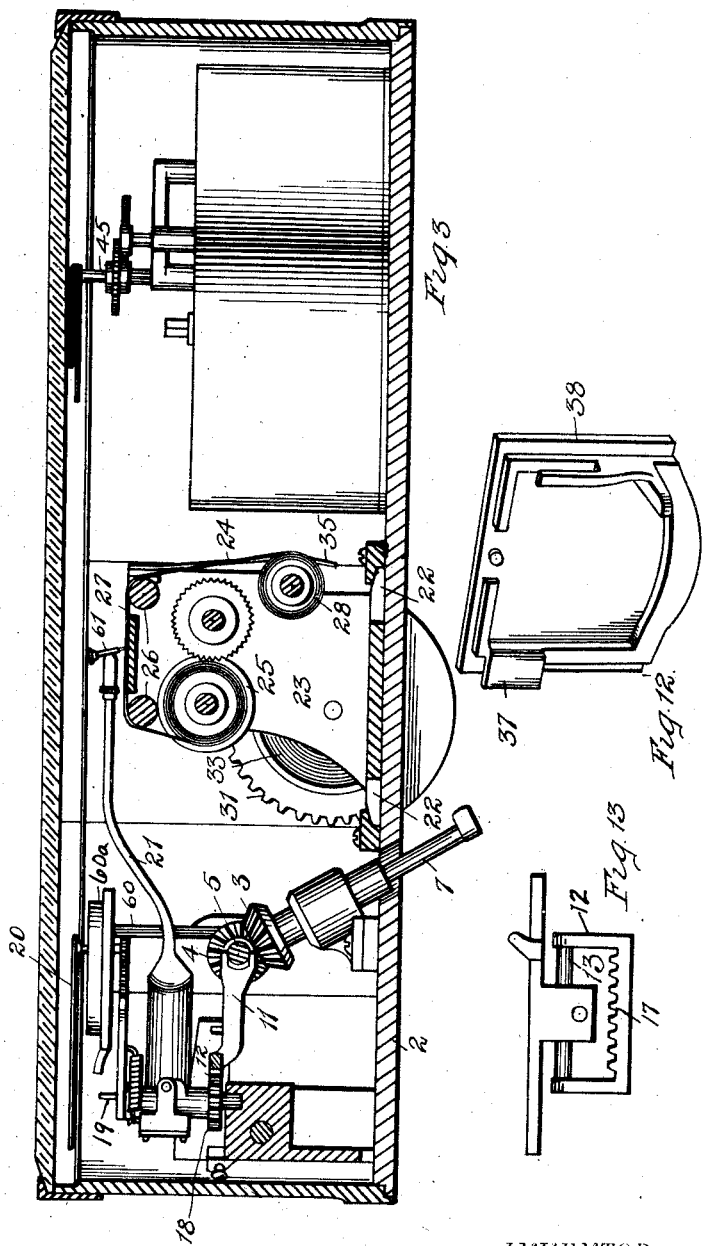

A. D. RENFRO.
SPEED INDICATOR AND RECORDER.
APPLICATION FILED FEB. 14, 1910.
982,021.
Patented Jan. 17, 1911.
5 SHEETS—SHEET 4.
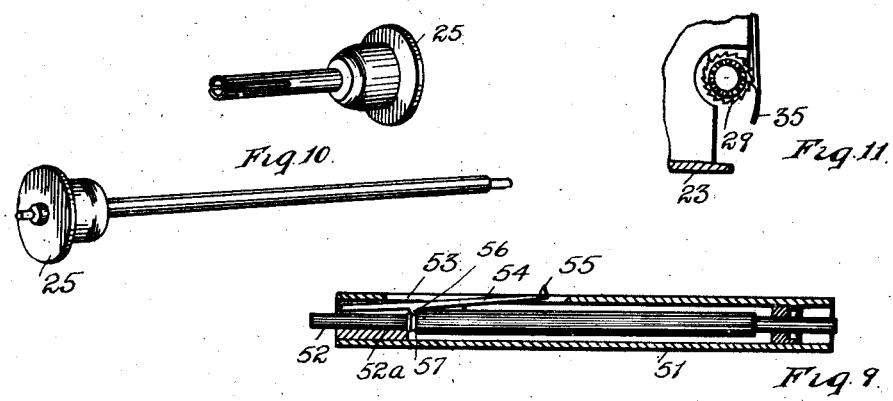
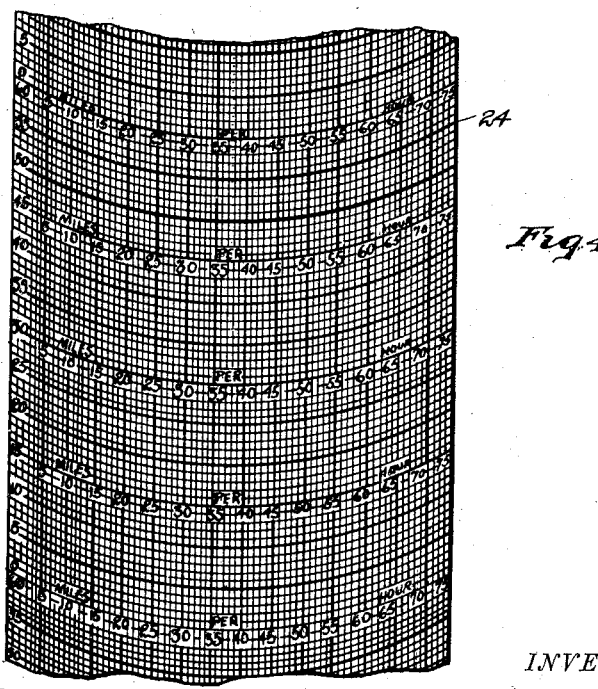
WITNESSES.
C. E. Day
Herman C Nicholaus
INVENTOR.
Alva D. Renfro
by Parker & Burton Attorneys.

A. D. RENFRO.
SPEED INDICATOR AND RECORDER.
APPLICATION FILED FEB. 14, 1910.

982,021.

Patented Jan. 17, 1911.

5 SHEETS—SHEET 5.

WITNESSES.
G. E. Day
Herman E. Nicholaus

INVENTOR.
Alva D. Renfro

By Parker & Burton Attorneys.

UNITED STATES PATENT OFFICE.

ALVA D. RENFRO, OF DETROIT, MICHIGAN, ASSIGNOR TO RENFRO SPEED-O-METER COMPANY, OF DETROIT, MICHIGAN, A CORPORATION OF MICHIGAN.

SPEED INDICATOR AND RECORDER.

982,021.  Specification of Letters Patent.  Patented Jan. 17, 1911.

Application filed February 14, 1910. Serial No. 543,894.

*To all whom it may concern:*

Be it known that I, ALVA D. RENFRO, a citizen of the United States, residing at Detroit, county of Wayne, State of Michigan, have invented a certain new and useful Improvement in Speed Indicators and Recorders, and declare the following to be a full, clear, and exact description of the same, such as will enable others skilled in the art to which it pertains to make and use the same, reference being had to the accompanying drawings, which form a part of this specification.

This invention relates to speed indicators and recorders, and has for its object an improved device of this type adapted to record on a clock-actuated sheet, or ribbon, the various speeds attained by a vehicle whereon the device is mounted, and the exact time of the attainment of each speed contemporaneously with the indication of each speed, as this varies from one moment to another, to the eye of an observer, by means of the passage of an indicating arrow over a suitably marked dial.

Figure 1:
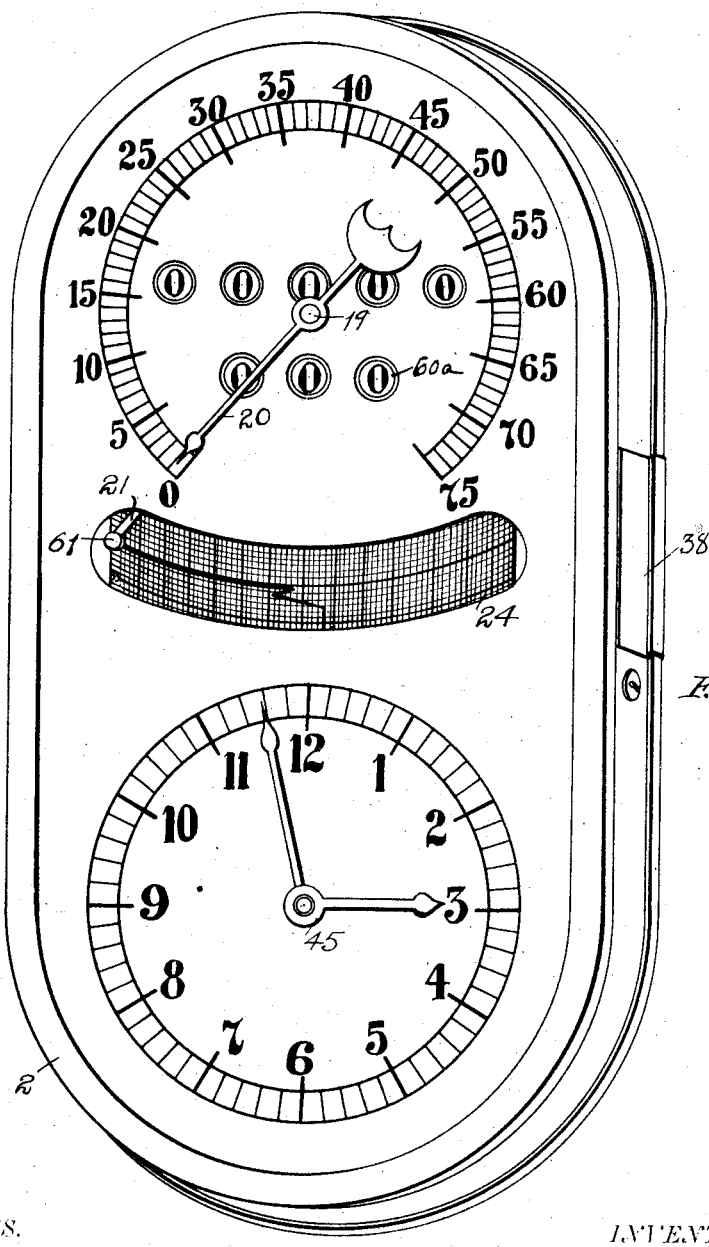
Figure 2:
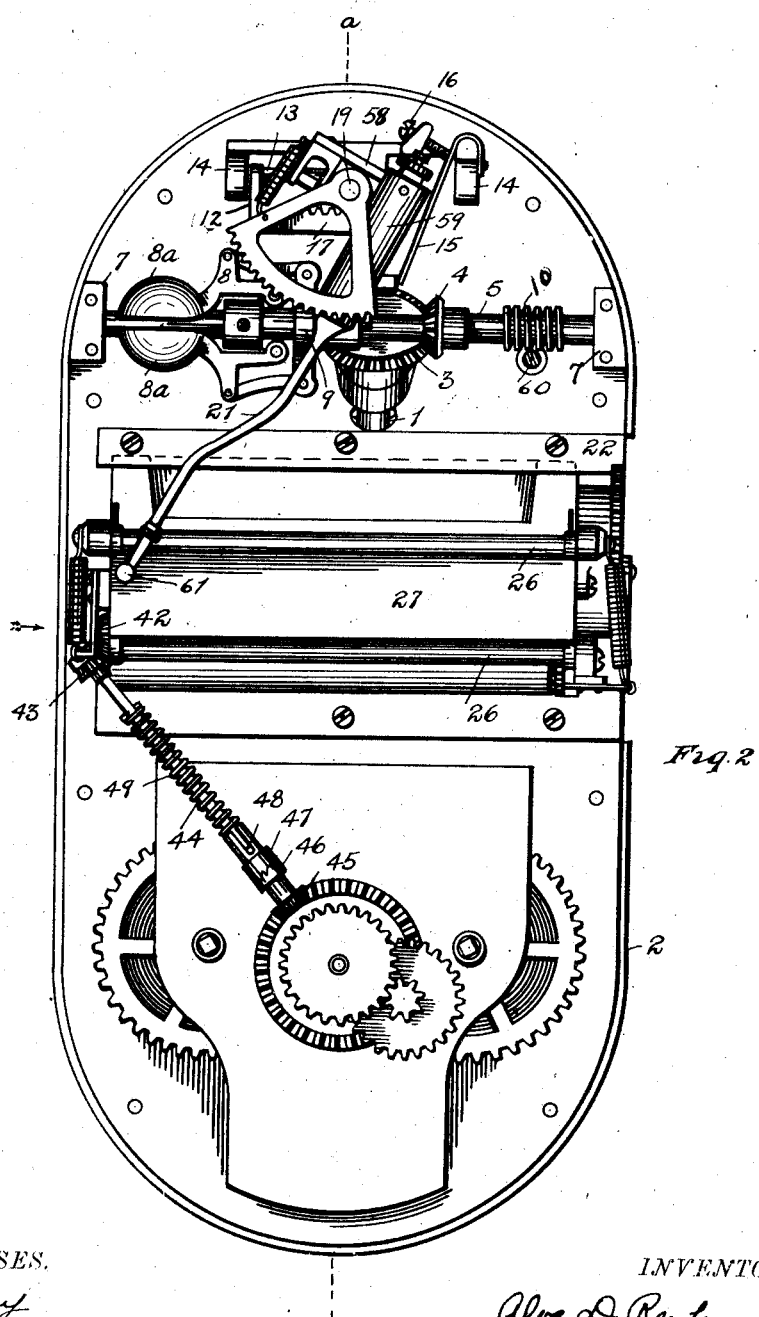
Figure 5:
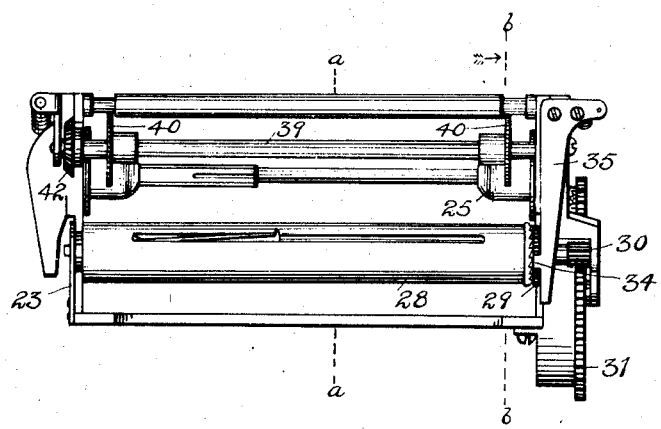
Figure 7:
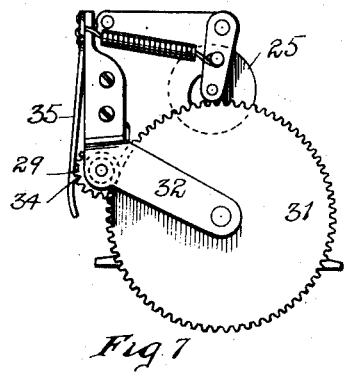
Figure 6:
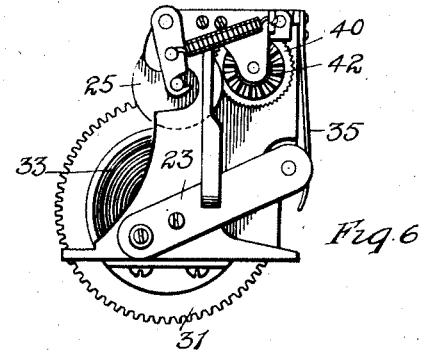
Figure 8:
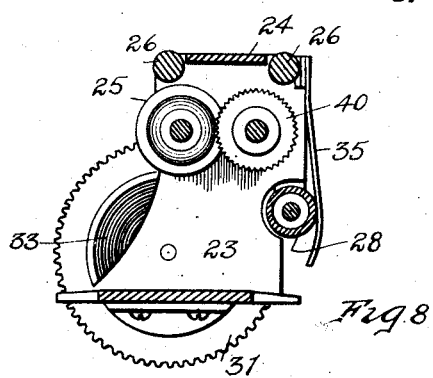

In the drawings,—Figure 1, is a plan view of the face of the instrument with the principal part of the operative mechanism covered by the top dial; the casing is shown slightly in perspective. Fig. 2, is a plan view, from above, with the covering glass top and the external indicating parts removed so as to show the operative parts. Fig. 3, is a longitudinal section taken along the line *a—a* of Fig. 2, some of the parts thus exposed being shown in section and some in elevation. Fig. 4, is a view of a portion of the record sheet. Fig. 5, is a front elevation of the mechanism for holding and winding and unwinding the recording ribbons. Fig. 6, is an elevation of the left hand end of the device shown in Fig. 5. Fig. 7, is an elevation of the right hand end of the device shown in Fig. 5. Fig. 8, is a sectional elevation along the line *b—b*, Fig. 5, looking in the direction of the arrow there shown. Fig. 9, is a sectional elevation of the drum upon which the record ribbon is wound as it is marked by the recording pen, after having been unwound from the storage drum. Fig. 10, is a perspective of the separable parts of the spindle whereon the ribbon drum is mounted in the drum carriage. Fig. 11, is a fragmentary sectional view of the spring detent member whereby the ribbon-actuating roll is thrown into or out of operative engagement with the regulating mechanism connected with the clock. Fig. 12, is a perspective of the door of the casing whose movement into position of closure controls the movement of this detent piece. Fig. 13, is a plan view of the carriage which is actuated by the speed of movement of the governor member, whose indicated variations in speed are both shown and recorded.

The rotative movement of the traction wheels of the vehicle is communicated by means of a flexible shaft to the terminal 1, on whose inner end, which extends within the casing 2, is carried the gear wheel 3 which meshes with the gear wheel 4 which is carried on the horizontal shaft 5, which is journaled in the uprights 7 on each side of the device. Slidably mounted on this shaft 5 is the governor member 8, whose shaft-surrounding collar 9 engages against the point of the jaw member 11, whose body part 12 is slidably mounted on a shaft 13, which is supported by uprights 14 in a position parallel to and somewhat higher than the shaft 5. This jaw member 11 is yieldingly held against the collar 9, or against a washer interposed between them and through it against the collar 9, by means of the leaf spring 15 which is carried by one of the uprights 14, and whose pressure is adjustable by means of the screw 16 which is mounted upon an attached portion of the upright members.

When the governor member is under no centrifugal strain and its parts 8ª consequently lie closely against the shaft 5, it can, because of its slidability therealong, yield to the resilient pressure of the leaf spring 15, and be pushed to the extreme left of its possible line of travel along the shaft. When the governor is in this position and the carriage member 12 is pushed as far to the left as it will go by the leaf spring 15, the ratchet bar 17 which it carries on its top, and which moves with it, is actuated by the intermeshing gear wheel 18 so as to swing the shaft 19, whereon it is mounted, in a counter-clockwise direction, thus causing the indicating arrow 20 and the pen-carrying arm 21 to swing to a zero position with respect to the visible indicating dial 6 and to the subdivided record sheet 24 respectively. When the movement of the car is communicated through the flexible shaft and its connections to the governor member, its centrifugal movement is of such degree as to make its separable ball members 8ᵃ move away from the shaft, consequently causing the collar member 9 to move from left to right therealong, and consequently forcing the jaw 11 therealong against the resilient pressure of the leaf spring 15. This, in turn, actuates the shaft 19 through the medium of the ratchet bar 17, and causes both the indicating arrow 20 and the pen-carrying arm 21 to move across the marked dial and recording sheet respectively. The higher the speed of rotation of the flexible shaft, the farther the governing member is forced away from its supporting shaft, and, consequently, the farther from left to right are these parts moved. The worm 10 on the shaft 5 intermeshes with a corresponding portion of the perpendicularly located shaft 60, by which the rotative movement of the shaft 1 is also communicated to the odometer 60ᵃ, with whose details this disclosure is not concerned.

Movably mounted in track ways 22, in the bottom of about the middle portion of the device, is the supporting framework 23 of the device for holding and winding and unwinding the record ribbon 24, which is primarily stored on the drum 25 which is rotatably mounted in the end frame portions 23. The record ribbon 24 is passed from it over the running rollers 26 and over the marking table 27, which is parallel with the plane of the dial of the device, to a receiving roller 28 which is similarly journaled on a framework 23 and which carries, preferably on its right hand end, a pair of ratchet wheels 29 and 30. Of these the wheel 30 is in intermeshing engagement with the much larger wheel 31 which is rotatably supported upon a projecting tongue 32 of the carriage, or frame, 23, and by whose rotation manually, when the device is first prepared for use, the power spring 33 is wound to a state of tension.

In controlling engagement with the teeth of the wheel 29 is the projecting point 34 of the leaf spring 35, which is mounted upon the frame 23, and which, so long as it is in engagement with the teeth of the wheel 29, prevents its rotation, and thereby the winding of the record sheet from the storage drum 25 out of the receiving drum 28, under the actuation of the spring 33. When the ribbon carriage is in fully inserted position with respect to the casing and remaining portions of the device, the door 38 may be slid into place in its bearings in the casing. In such position the laterally projecting tongue 37 engages under the tip of the spring 35 in a way to disengage it from connection with the teeth of the wheel 29, and thus allow it to receive actuation from the wound-up spring 33. Still another shaft 39 is rotatably journaled in the frame 23. Near each end it carries the paper engaging wheels 40 whose teeth are adapted to engage the paper with sufficient perforating effect to firmly seize it, for purposes of timing regulation, as these toothed wheels rotate. At one end of the shaft 39 (preferably the left end, because of the presence of the coil spring and its attached parts at the other end of the carriage 23) there is fixed to the shaft the gear wheel 42 which, when the carriage is in fully inserted position, is adapted to intermesh with the gear wheel 43 which is carried on the end of the shaft 44 by which, through the medium of the gear wheel 45 whose proportionate size has been made the subject of proper calculation, timed actuation is communicable to the record sheet from the clock mechanism 45. While this communication from the medium of the shaft 44 might, without departure from the spirit of this invention, involve the use of merely a one piece shaft, it is easy to conceive that in the use of the device the last end of the recording ribbon would only infrequently be reached at the same time that the clock mechanism would run down, and that, therefore, the timed actuation of the ribbon through the medium of the toothed wheel 40 would result in tearing the last end of the recording ribbon from its supporting roll, because of this continued movement of the shaft due to the yet active clock mechanism. In order, therefore, that this may be obviated, I provide on the collar of the gear wheel 45 a ratchet toothed edge 46 which is in engagement with a complementarily toothed sleeve 47, which is slidable lengthwise of the shaft 44 but is held from rotative movement with respect thereto by the pin 48, which engages in its cut away portion 47ᵃ. This sleeve is yieldingly held in engagement with the toothed portion of the wheel member 45 by the spring 49, so that, so long as the ribbon feed is run smoothly and uninterruptedly, the pressure of the spring 49 will keep the toothed parts 46 and 47 in engagement and the entire movement of the clock will be duly communicated through the shaft 44 to the record ribbon. When, however, the end of the ribbon is reached, the pull of its end portion against separation from its storage drum is such that the further rotation of the shaft 44 is resisted to such a degree that the toothed portion 46 of the gear wheel 45 is caused to slip, with respect to the toothed portion 46, instead of carrying it with it. As the high points of the teeth attain a position opposite to one another in this rotation the sleeve 47 is forced against the resiliency of the sleeve 48 along the shaft 44 in the direction of the gear wheel 43, but when the continued rotation of the wheel 45 carries the points of the teeth past such position the pressure of the spring forces the sleeve 47 along the shaft 44 toward the wheel 45, so that the toothed portions are again in complementary and interlocking engagement.

In Figs. 9 and 10 I have illustrated my preferred mechanism for connecting the paste board storage tube, whereon the beginning terminal of the recording ribbon is mounted, with the journaled metal parts permanently carried by the device. This consists of a drum or sleeve 51 which is adapted to be slipped within the hollowed center of the paste board storage drum. Extending therethrough is the shaft 52, and extending through an aperture 53 in the side thereof is a pivoted arm 54 whose sharpened point 55 may be projected to a position outside of the plane of the outer face of the tube 51. When the point 56 of this arm is opposite the portion 52ª of the shaft, the arm falls so far within the aperture 53 that the point 55 lies within the plane of the face of the casing 51, but when, by the movement of the shaft within and lengthwise of the tube 51, the point 56 is moved into the groove 57, it is projected without the apertured portion of the casing and into the yielding mass of the paste board so that it is held from either rotation or lengthwise movement with respect to the supporting casing 51, and thus the full rotative movement imparted to the shaft casing 51 is communicated to a ribbon as desired.
When the removal of the paste board drum is desired, the movement of the shaft 52 lengthwise of the casing may be effected by a fairly firm pressure of the same against a solid object so as to avoid the displacement of the point 56 from the groove 57, thus permitting the pasteboard-engaging point 55 to fall again within the aperture 53. Upon a projecting shoulder 19ª of the shaft 19 is mounted the carriage 58 whereon is supported the tank, or tube, 59 in which the ink for the recording pen is stored. Extending from the forward end of this tank, and of course in communication with the interior thereof, is the recording finger 60 on whose end is carried the pen 61 which is adapted to trace its movements under the actuation of the governor member, as heretofore described, on the recording sheet which is passing over the table 27 immediately beneath its point, thus tracing in a line varying according to the speed of the vehicle the various speeds attained.

The details of my preferred pen mechanism, I make no claim to in this application.

Claims:—

1. A speed indicator and recorder, having, in combination with a rotatable shaft, a ball governor carried thereby, a pair of rollers upon and between which a record sheet is carried, an indicating and marking arm pivotally supported in a generally lengthwise position with respect to the record sheet, said arm having an operative connection with said ball governor, whereby it is actuated from its position of rest with its marking point adjacent one edge of the sheet by the movement of said ball governor, proportionately to the rotative speed thereof, spring actuated means for actuating said rollers to cause the travel of the record sheet from one roller to the other, a clock mechanism for regulating the speed of travel of the record sheet, and an automatically disconnectible shaft between the clock mechanism and one of the rollers, whereby actuation is imparted therefrom to the roller only when its speed is not consonant with the desired rate as determined by the clock mechanism, substantially as described.

2. In a speed indicator and recorder, the combination of a centrifugal governor member adapted to receive its actuation from a rotatable shaft, an indicating and recording arm pivotally supported transversely of said shaft, a toothed rack member, whereby the direction and degree of swing of said arm from its normally inactive marking position is regulated by the centrifugal position of said governor member, means for storing a record sheet in such position with respect to the indicating and recording arm that selected portions of the sheet will receive the imprint of said arm, means for causing the timed travel of the sheet, in a direction generally lengthwise of said arm, a clock mechanism for regulating the speed of travel of the sheet; and means adapted to normally connect said clock mechanism with said sheet mechanism, whereby, under certain conditions, the same may be automatically disconnected therefrom, substantially as described.

3. In a speed indicator and recorder, in combination with a clockwork mechanism, a pair of rotatable storage rolls whereon and between which a record sheet may be wound, spring driven means for causing their rotation, automatically disconnectible means actuated by said clock work mechanism whereby said rolls are automatically accelerated or retarded in their movement, a governor member adapted to receive its actuation from a rotatable shaft, and a pivoted recording finger adapted to be caused to swing across the record sheet by the movement of the governor member, the degree of its swing being regulated by the rotative speed of the governor member, substantially as described.

4. A speed indicator and recorder, having, in combination with a governor member and a supporting rotatable shaft, a pivoted indicating and recording member adapted to be actuated thereby in direct proportion to the rotative speed of the shaft, a pair of rollers between which a record sheet is adapted to travel lengthwise of said indicating and recording member and in position to be marked by the oscillatory end of said indicating and recording member, means for actuating the rollers, means for regulating the speed of rotation thereof and consequently the speed of travel of the sheet, and an automatically disconnectible shaft for normally correlating said regulating means and said rollers, substantially as described.

5. In a speed indicator and recorder, the combination of a pair of rotatable rolls whereon and between which a record sheet is adapted to travel, spring actuated means for actuating said rolls and thereby the record sheet, clock-actuated means for regulating such actuation, an automatically disconnectible shaft connecting said regulating means and said actuating means, a rotatable shaft and a governor member carried thereby, and an indicating and recording finger pivotally supported in position of operative connection with said shaft and governor member, and adapted to oscillate across the exposed surface of the moving record sheet when actuated by the rotation of said shaft and consequently of the governor member, substantially as described.

In testimony whereof, I sign this specification in the presence of two witnesses.

ALVA D. RENFRO.

Witnesses:
VIRGINIA C. SPRATT,
WILLIAM M. SWAN.